(12) United States Patent
Schoettler

(10) Patent No.: US 9,152,984 B1
(45) Date of Patent: Oct. 6, 2015

(54) PERSONAL AD TARGETING

(75) Inventor: Steve Schoettler, Menlo Park, CA (US)

(73) Assignee: Zynga Inc., San Francisco, CA (US)

( * ) Notice: Subject to any disclaimer, the term of this patent is extended or adjusted under 35 U.S.C. 154(b) by 73 days.

(21) Appl. No.: 13/549,252

(22) Filed: Jul. 13, 2012

Related U.S. Application Data

(60) Provisional application No. 61/507,940, filed on Jul. 14, 2011.

(51) Int. Cl.
*G06Q 30/00* (2012.01)
*G06Q 30/02* (2012.01)

(52) U.S. Cl.
CPC ........ *G06Q 30/0269* (2013.01); *G06Q 30/0209* (2013.01)

(58) Field of Classification Search
CPC .................................................. G06Q 30/0209
USPC ....................................................... 705/14.12
See application file for complete search history.

(56) References Cited

U.S. PATENT DOCUMENTS

| | | | |
|---|---|---|---|
| 1,599,460 A | 9/1926 | Craze | |
| 3,941,388 A | 3/1976 | Isaac et al. | |
| 5,018,975 A | 5/1991 | Todd | |
| 5,197,884 A | 3/1993 | Roemer, Jr. et al. | |
| 5,823,879 A | 10/1998 | Goldberg et al. | |
| 5,918,213 A | 6/1999 | Bernard et al. | |
| 5,941,772 A | 8/1999 | Paige | |
| 6,061,660 A | 5/2000 | Eggleston et al. | |
| 6,196,920 B1 | 3/2001 | Spaur et al. | |
| 6,749,511 B2 | 6/2004 | Day | |
| 7,054,830 B1 | 5/2006 | Eggleston et al. | |
| 7,054,831 B2 | 5/2006 | Koenig | |
| 7,266,509 B2 | 9/2007 | Koenig | |
| 7,455,586 B2 | 11/2008 | Nguyen et al. | |
| 7,729,946 B2 | 6/2010 | Chu | |
| 7,792,698 B1 | 9/2010 | Veach et al. | |
| 8,029,359 B2 | 10/2011 | Cheng | |
| 8,180,672 B2 | 5/2012 | Curtis et al. | |
| 8,272,964 B2 | 9/2012 | Van Datta et al. | |
| 8,328,642 B2 | 12/2012 | Mosites et al. | |
| 8,449,385 B2 | 5/2013 | Mosites et al. | |

(Continued)

FOREIGN PATENT DOCUMENTS

| | | |
|---|---|---|
| WO | WO-2006005073 A2 | 1/2006 |
| WO | WO-2006071246 A1 | 7/2006 |
| WO | WO-2012138786 A1 | 10/2012 |

OTHER PUBLICATIONS

"U.S. Appl. No. 13/079,148, Examiner Interview Summary mailed Apr. 17, 2013", 3 pgs.

(Continued)

*Primary Examiner* — John G Weiss
*Assistant Examiner* — Scott C Anderson
(74) *Attorney, Agent, or Firm* — Schwegman Lundberg & Woessner, P.A.

(57) ABSTRACT

A system and method for selecting and customizing advertisements to be provided to a user includes monitoring user interactions within a virtual gaming environment and indirectly determining user characteristics based on the monitored user interactions. A user profile is generated from the user characteristics. An advertisement is selected and customized for the user based on the user profile. The advertisement is provided for display to the user in the virtual gaming environment.

22 Claims, 7 Drawing Sheets

(56) References Cited

U.S. PATENT DOCUMENTS

| | | | |
|---|---|---|---|
| 8,491,380 | B2 | 7/2013 | Mosites et al. |
| 8,655,731 | B2 | 2/2014 | Bosarge et al. |
| 2002/0013174 | A1 | 1/2002 | Murata |
| 2002/0022516 | A1 | 2/2002 | Forden |
| 2002/0065746 | A1 | 5/2002 | Lewis |
| 2002/0082910 | A1 | 6/2002 | Kontogouris |
| 2002/0087403 | A1 | 7/2002 | Meyers et al. |
| 2002/0155891 | A1 | 10/2002 | Okada et al. |
| 2002/0193099 | A1 | 12/2002 | Paulsen |
| 2003/0103644 | A1 | 6/2003 | Klayh |
| 2003/0141660 | A1 | 7/2003 | Colapinto et al. |
| 2003/0181242 | A1 | 9/2003 | Lee et al. |
| 2003/0230848 | A1 | 12/2003 | Mellerowicz |
| 2004/0148221 | A1 | 7/2004 | Chu |
| 2005/0033771 | A1 | 2/2005 | Schmitter et al. |
| 2005/0091106 | A1 | 4/2005 | Reller et al. |
| 2005/0137015 | A1* | 6/2005 | Rogers et al. .................. 463/42 |
| 2005/0202862 | A1 | 9/2005 | Shuman et al. |
| 2006/0009284 | A1 | 1/2006 | Schwartz et al. |
| 2006/0063580 | A1 | 3/2006 | Nguyen et al. |
| 2006/0063587 | A1 | 3/2006 | Manzo |
| 2006/0085261 | A1 | 4/2006 | Chu |
| 2006/0116194 | A1 | 6/2006 | Pacey et al. |
| 2006/0128469 | A1 | 6/2006 | Willis et al. |
| 2006/0135232 | A1* | 6/2006 | Willis ............................... 463/1 |
| 2006/0148551 | A1 | 7/2006 | Walker et al. |
| 2006/0148573 | A1 | 7/2006 | Willis et al. |
| 2006/0178918 | A1* | 8/2006 | Mikurak ........................... 705/7 |
| 2006/0259473 | A1 | 11/2006 | Li et al. |
| 2007/0078706 | A1 | 4/2007 | Datta et al. |
| 2007/0130015 | A1 | 6/2007 | Starr et al. |
| 2007/0174258 | A1 | 7/2007 | Jones et al. |
| 2007/0226062 | A1 | 9/2007 | Hughes et al. |
| 2007/0265090 | A1 | 11/2007 | Barsness et al. |
| 2008/0016040 | A1 | 1/2008 | Jones et al. |
| 2008/0065481 | A1 | 3/2008 | Immorlica et al. |
| 2008/0097822 | A1 | 4/2008 | Schigel et al. |
| 2008/0102947 | A1 | 5/2008 | Hays et al. |
| 2008/0147497 | A1 | 6/2008 | Tischer |
| 2008/0167106 | A1 | 7/2008 | Lutnick |
| 2008/0256061 | A1 | 10/2008 | Chang et al. |
| 2008/0275755 | A1 | 11/2008 | Brustein et al. |
| 2008/0306826 | A1 | 12/2008 | Kramer et al. |
| 2009/0006375 | A1 | 1/2009 | Lax et al. |
| 2009/0018905 | A1 | 1/2009 | Roberts |
| 2009/0054140 | A1 | 2/2009 | Beser et al. |
| 2009/0069078 | A1 | 3/2009 | Nguyen et al. |
| 2009/0094138 | A1* | 4/2009 | Sweitzer et al. ................ 705/27 |
| 2009/0124311 | A1 | 5/2009 | Sandberg |
| 2009/0124384 | A1 | 5/2009 | Smith et al. |
| 2009/0164287 | A1 | 6/2009 | Kies et al. |
| 2009/0167766 | A1 | 7/2009 | Porter et al. |
| 2009/0197681 | A1* | 8/2009 | Krishnamoorthy et al. .... 463/42 |
| 2009/0198573 | A1 | 8/2009 | Fox |
| 2009/0198576 | A1 | 8/2009 | Rogers, Jr. |
| 2009/0204706 | A1 | 8/2009 | Ertugrul et al. |
| 2009/0217319 | A1 | 8/2009 | Weiss |
| 2009/0239663 | A1 | 9/2009 | Ferdinand et al. |
| 2009/0247282 | A1 | 10/2009 | Cheng |
| 2009/0259531 | A1 | 10/2009 | Van Zwol |
| 2009/0265163 | A1 | 10/2009 | Li et al. |
| 2009/0298594 | A1 | 12/2009 | Pueyo et al. |
| 2010/0005489 | A1 | 1/2010 | Losey |
| 2010/0016080 | A1 | 1/2010 | Garden et al. |
| 2010/0017283 | A1 | 1/2010 | Hamilton, II et al. |
| 2010/0022310 | A1 | 1/2010 | Van Datta et al. |
| 2010/0037160 | A1 | 2/2010 | Hamilton, II et al. |
| 2010/0042619 | A1 | 2/2010 | Jones et al. |
| 2010/0069151 | A1 | 3/2010 | Suchocki |
| 2010/0130276 | A1 | 5/2010 | Fiden et al. |
| 2010/0131355 | A1 | 5/2010 | Kitchen et al. |
| 2010/0161406 | A1 | 6/2010 | Narayan |
| 2010/0174593 | A1 | 7/2010 | Cao et al. |
| 2010/0185687 | A1 | 7/2010 | Chung et al. |
| 2010/0203952 | A1 | 8/2010 | Zalewski |
| 2010/0211431 | A1 | 8/2010 | Lutnick et al. |
| 2010/0332331 | A1 | 12/2010 | Etchegoyen |
| 2011/0041153 | A1 | 2/2011 | Simon et al. |
| 2011/0065421 | A1 | 3/2011 | Gluck et al. |
| 2011/0106630 | A1 | 5/2011 | Hegeman et al. |
| 2011/0159940 | A1 | 6/2011 | Acres |
| 2011/0312423 | A1 | 12/2011 | Mosites et al. |
| 2012/0015716 | A1 | 1/2012 | Mosites et al. |
| 2012/0015717 | A1 | 1/2012 | Mosites et al. |
| 2012/0016726 | A1 | 1/2012 | Mosites et al. |
| 2012/0047017 | A1 | 2/2012 | Hernandez et al. |
| 2012/0108306 | A1 | 5/2012 | Munsell et al. |
| 2012/0252557 | A1 | 10/2012 | Chow et al. |
| 2012/0252559 | A1 | 10/2012 | Chow et al. |
| 2012/0252573 | A1 | 10/2012 | Chow et al. |
| 2012/0252574 | A1 | 10/2012 | Chow et al. |
| 2012/0270615 | A1 | 10/2012 | Jones et al. |
| 2012/0270650 | A1 | 10/2012 | Jones et al. |
| 2012/0278173 | A1 | 11/2012 | Vaidyanathan et al. |
| 2013/0102393 | A1 | 4/2013 | Willis |
| 2013/0232000 | A1 | 9/2013 | van Datta et al. |
| 2013/0232001 | A1 | 9/2013 | van Datta et al. |
| 2014/0248943 | A1 | 9/2014 | Burgin et al. |
| 2014/0316870 | A1 | 10/2014 | Burgin et al. |

OTHER PUBLICATIONS

"U.S. Appl. No. 13/079,148, Final Office Action mailed Sep. 25, 2013", 15 pgs.

"U.S. Appl. No. 13/079,148, Non Final Office Action mailed May 2, 2014", 18 pgs.

"U.S. Appl. No. 13/079,148, Non Final Office Action mailed Dec. 18, 2012", 18 pgs.

"U.S. Appl. No. 13/079,148, Response filed Jan. 27, 2014 to Final Office Action dated Sep. 25, 2013", 17 pgs.

"U.S. Appl. No. 13/079,148, Response filed May 20, 2013 to Non Final Office Action mailed Dec. 28, 2012", 31 pgs.

"U.S. Appl. No. 13/174,763, Final Office Action mailed May 23, 2014", 23 pgs.

"U.S. Appl. No. 13/174,763, Non Final Office Action mailed Oct. 2, 2013", 22 pgs.

"U.S. Appl. No. 13/174,763, Response filed Feb. 10, 2014 to Non Final Office Action mailed Oct. 2, 2013", 16 pgs.

"U.S. Appl. No. 13/244,739, Advisory Action mailed Jul. 11, 2012", 4 pgs.

"U.S. Appl. No. 13/244,739, Examiner Interview Summary mailed Feb. 7, 2012", 8 pgs.

"U.S. Appl. No. 13/244,739, Final Office Action mailed Apr. 30, 2012", 10 pgs.

"U.S. Appl. No. 13/244,739, Final Office Action mailed Sep. 19, 2013", 12 pgs.

"U.S. Appl. No. 13/244,739, Non Final Office Action mailed Jan. 19, 2012", 11 pgs.

"U.S. Appl. No. 13/244,739, Non Final Office Action mailed May 9, 2014", 12 pgs.

"U.S. Appl. No. 13/244,739, Non Final Office Action mailed Dec. 7, 2012", 10 pgs.

"Appl. No. 13/244,739, Response filed Mar. 19, 2014 to Final Office Action mailed Sep. 19, 2013", 12 pgs.

"U.S. Appl. No. 13/244,739, Response filed Apr. 8, 2013 to Non Final Office Action mailed Dec. 7, 2012", 17 pgs.

"U.S. Appl. No. 13/244,739, Response filed Apr. 19, 2012 to Non Final Office Action mailed Jan. 19, 2012", 14 pgs.

"U.S. Appl. No. 13/244,739, Response filed Jul. 2, 2012 to Final Office Action mailed Apr. 30, 2012", 17 pgs.

"U.S. Appl. No. 13/244,739, Response filed Oct. 30, 2012 to Advisory Action mailed Apr. 30, 2012", 16 pgs.

"U.S. Appl. No. 13/244,858, Examiner Interview Summary mailed Feb. 7, 2012", 8 pgs.

"U.S. Appl. No. 13/244,858, Final Office Action mailed Jun. 1, 2012", 13 pgs.

"U.S. Appl. No. 13/244,858, Non Final Office Action mailed Jan. 25, 2012", 13 pgs.

"U.S. Appl. No. 13/244,858, Non Final Office Action mailed Apr. 25, 2014", 18 pgs.

(56) References Cited

OTHER PUBLICATIONS

"U.S. Appl. No. 13/244,858, Response filed Apr. 25, 2012 to Non Final Office Action mailed Jan. 25, 2012", 15 pgs.
"U.S. Appl. No. 13/244,858, Response filed Dec. 3, 2012 to Final Office Action mailed Jun. 1, 2012", 19 pgs.
"U.S. Appl. No. 13/244,861, Examiner Interview Summary Mailed Feb. 9, 2012", 8 pgs.
"U.S. Appl. No. 13/244,861, Final Office Action mailed Jun. 1, 2012", 13 pgs.
"U.S. Appl. No. 13/244,861, Non Final Office Action mailed Jan. 25, 2012", 12 pgs.
"U.S. Appl. No. 13/244,861, Non Final Office Action mailed Apr. 25, 2014", 15 pgs.
"U.S. Appl. No. 13/244,861, Response filed Apr. 25, 2012 to Non Final Office Action mailed Jan. 25, 2012", 18 pgs.
"U.S. Appl. No. 13/244,861, Response filed Dec. 3, 2012 to Final Office Action mailed Jun. 1, 2012", 19 pgs.
"U.S. Appl. No. 13/720,280, Final Office Action mailed Jul. 10, 2014", 14 pgs.
"U.S. Appl. No. 13/720,280, Non Final Office Action mailed Nov. 26, 2013", 15 pgs.
"U.S. Appl. No. 13/720,280, Preliminary Amendment mailed Jan. 8, 2014", 3 pgs.
"U.S. Appl. No. 13/720,280, Response filed Apr. 28, 2014 to Non Final Office Action mailed Nov. 26, 2013", 10 pgs.
"U.S. Appl. No. 13/720,361, Final Office Action mailed Jun. 4, 2014", 13 pgs.
"U.S. Appl. No. 13/720,361, Non Final Office Action mailed Nov. 20, 2013", 14 pgs.
"U.S. Appl. No. 13/720,361, Response filed Mar. 19, 2014 to Non-Final Office Action dated Nov. 20, 2013", 9 pgs.
"U.S. Appl. No. 14/194,657, Preliminary Amendment mailed", 10 pgs.
"International Application Serial No. PCT/US2012/032209, International Preliminary Report on Patentability mailed Oct. 17, 2013", 9 pgs.
"International Application Serial No. PCT/US2012/032209, International Search Report mailed Jun. 29, 2012", 4 pgs.
"International Application Serial No. PCT/US2012/032209, Written Opinion mailed Jun. 29, 2012", 9 pgs.
"U.S. Appl. No. 13/079,148, Final Office Action mailed Nov. 7, 2014", 17 pgs.
"U.S. Appl. No. 13/244,739, Final Office Action mailed Nov. 6, 2014", 14 pgs.
"U.S. Appl. No. 13/244,858, Final Office Action mailed Nov. 3, 2014", 18 pgs.
"U.S. Appl. No. 13/244,861, Final Office Action mailed Nov. 6, 2014", 17 pgs.
"U.S. Appl. No. 13/720,280, Non Final Office Action mailed Oct. 1, 2014", 15 pgs.
"U.S. Appl. No. 13/720,361, Non Final Office Action mailed Nov. 6, 2014", 24 pgs.
"U.S. Appl. No. 13/720,361, Response filed Oct. 6, 2014 to Final Office Action dated Jun. 4, 2014", 9 pgs.
"U.S. Appl. No. 13/079,148, Examiner Interview Summary mailed Aug. 25, 2014", 3 pgs.
"U.S. Appl. No. 13/079,148, Response filed Sep. 2, 2014 to Non-Final Office Action dated May 2, 2014", 27 pgs.
"U.S. Appl. No. 13/174,763, Response filed Aug. 25, 2014 to Final Office Action mailed May 23, 2014", 15 pgs.
"U.S. Appl. No. 13/244,739, Examiner Interview Summary mailed Aug. 25, 2014", 3 pgs.
"U.S. Appl. No. 13/244,739, Response filed Sep. 9, 2014 to Non-Final Office Action dated May 9, 2014", 13 pgs.
"U.S. Appl. No. 13/244,858, Examiner Interview Summary mailed Aug. 22, 2014", 3 pgs.
"U.S. Appl. No. 13/244,858, Response filed Aug. 25, 2014 to Non-Final Office Action dated Apr. 25, 2014", 15 pgs.
"U.S. Appl. No. 13/244,861, Examiner Interview Summary mailed Aug. 25, 2014", 3 pgs.
"U.S. Appl. No. 13/244,861, Response filed Aug. 25, 2014 to Non-Final Office Action dated Apr. 25, 2014", 19 pgs.
"U.S. Appl. No. 13/720,280, Examiner Interview Summary mailed Sep. 17, 2014", 3 pgs.
"U.S. Appl. No. 13/720,280, Response filed Sep. 16, 2014 to Final Office Action dated Jul. 10, 2014", 10 pgs.
"U.S. Appl. No. 13/079,148, Non Final Office Action mailed Apr. 2, 2015", 23 pgs.
"U.S. Appl. No. 13/079,148, Response fled Mar. 9, 2015 to Final Office Action mailed Nov. 7, 2014", 15 pgs.
"U.S. Appl. No. 13/174,763, Non Final Office Action mailed Feb. 20, 2015", 25 pgs.
"U.S. Appl. No. 13/244,739, Non Final Office Action mailed Apr. 2, 2015", 18 pgs.
"U.S. Appl. No. 13/244,739, Response filed Mar. 6, 2015 to Final Office Action mailed Nov. 6, 2014", 13 pgs.
"U.S. Appl. No. 13/244,858, Non Final Office Action mailed Apr. 2, 2015", 17 pgs.
"U.S. Appl. No. 13/244,858, Response filed Mar. 3, 2015 to Final Office Action mailed Nov. 3, 2014", 14 pgs.
"U.S. Appl. No. 13/244,861, Non Final Office Action mailed Apr. 2, 2015", 20 pgs.
"U.S. Appl. No. 13/244,861, Response filed Mar. 6, 2015 to Final Office Action mailed Nov. 6, 2014", 15 pgs.
"U.S. Appl. No. 13/720,280, Final Office Action mailed Mar. 17, 2015", 18 pgs.
"U.S. Appl. No. 13/720,280, Response filed Dec. 23, 2014 to Non-Final Office Action dated Oct. 1, 2014", 13 pgs.
"U.S. Appl. No. 13/720,361, Examiner Interview Summary mailed Feb. 20, 2015", 4 pgs.
"U.S. Appl. No. 13/720,361, Response filed Feb. 16, 2015 to Non Final Office Action mailed Nov. 6, 2014", 15 pgs.
"U.S. Appl. No. 13/720,361, Final Office Action mailed Apr. 28, 2015", 16 pgs.

* cited by examiner

PERSONAL AD TARGETING

CROSS-REFERENCE TO RELATED APPLICATIONS

This application claims priority under 35 U.S.C. §119(e) to U.S. Provisional Patent Application No. 61/501,940, filed Jul. 14, 2011, and entitled "System and Method for Targeting Advertisements Based on Individual Behaviors," which application is incorporated by reference herein in its entirety.

TECHNICAL FIELD

The present disclosure relates to targeting advertisements to users, for example, in games and applications. In an example embodiment, an advertisement customization platform is provided to customize advertisements based on individual user profiles.

BACKGROUND

Advertisements can be customized to target specific consumers to enhance the likelihood of a consumer response to an advertisement. Information about the consumer, such as user profiles, purchased items, web page views, and item reviews are analyzed to target advertisements. Typically, this information is used to group consumers into general categories for purposes of targeting specific advertisements. Unfortunately, advertising providers are capable of only collecting limited information, and the information collected only allows for targeting a general group of consumers and does not allow for targeting individuals.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Information about individual users of a computer-implemented virtual game may be collected and analyzed to offer highly personalized advertisements (ads) to the users. This information may include individual user preferences, characteristics or behavior during gameplay. A user's 'personality' may also be determined from a user's preferences, characteristics or behavior during gameplay. In-game experiments may also be conducted to gather information regarding a user. The user's personality, characteristics, behavior and preferences may be used to generate a user profile, and the user profile may be used to select ads and customize ads. Providing a highly personalized ad can increase user response and revenues for the advertisers and the virtual game provider. Various example embodiments described herein provide an example system that may customize ads based on a user profile generated from user behavior during virtual gameplay.

For example, a user may prefer the color blue, and this may be determined from the color of his or her avatar costume. Based on this, the ads may be customized to display with a blue background. The ad may also be customized to display an item available in blue. In another example, a user determined to be a 'follower' (e.g., a person easily influenced by other persons) may see an ad that includes a message stating that a friend of the user has bought this item. In some example embodiments, in-game experiments may also be conducted to collect data regarding user preferences and responsiveness. For example, the user's response to ad placement (e.g., location within the virtual environment, time at which the ad is presented, etc.), sounds, and dialogues can be collected through in-game experiments or using other techniques. Because of the highly interactive nature of virtual gaming systems, these experiments (or user interactions) may be conducted without the user's knowledge. Thus, in an example embodiment, subjective preferences of a user may be identified through the user's interactions and selections.

Figure 1:
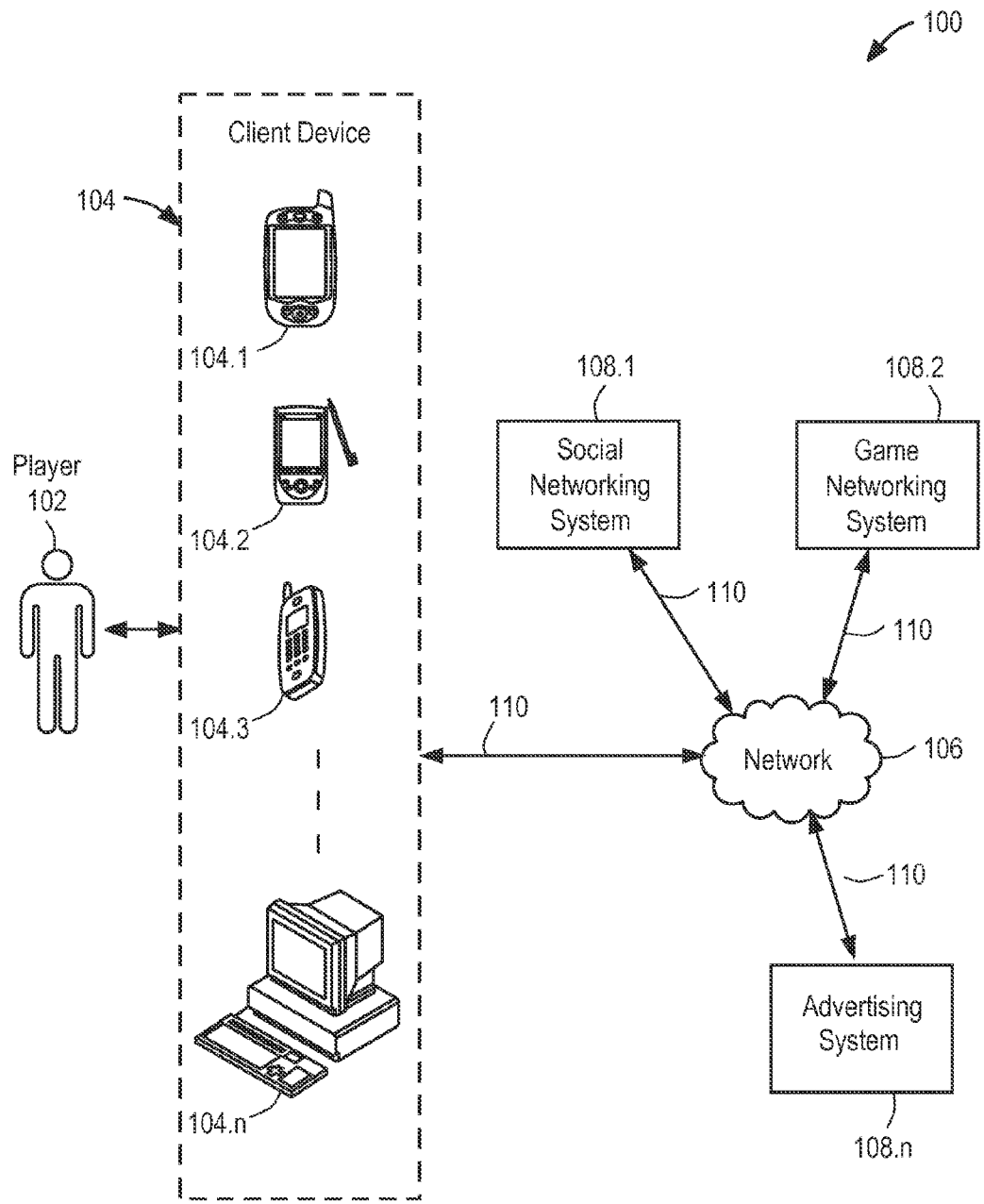
FIG. 1 illustrates an example of a system for implementing various example embodiments.

In some example embodiments, an analysis module may be provided to generate a user profile for an individual user. An ad customization module may also be provided to select specific offers and to customize the ad display, Example System FIG. 1 illustrates an example of a system 100 for implementing various example embodiments. In some embodiments, the system 100 comprises a player 102, a client device 104, a network 106, a social networking system 108.1, a game networking system 108.2, and one or more advertising systems (e.g., an advertising system 108.*n*). The components of the system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client device 104 may be any suitable computing device (e.g., devices 104.1-104.*n*), such as a smart phone 104.1, a personal digital assistant 104.2, a mobile phone 104.3, a personal computer 104.*n*, a laptop, a computing tablet, or any other device suitable for playing a virtual game. The client device 104 may access the social networking system 108.1 or the game networking system 108.2 directly, via the network 106, or via a third-party system. For example, the client device 104 may access the game networking system 108.2 via the social networking system 108.1.

The social networking system 108.1 may include a network-addressable computing system that can host one or more social graphs (see for example FIG. 2), and may be accessed by the other components of system 100 either directly or via the network 106. The social networking system 108.1 may generate, store, receive, and transmit social networking data. Moreover, the game networking system 108.2 may include a network-addressable computing system (or systems) that can host one or more virtual games, for example, online games. The game networking system 108.2 may generate, store, receive, and transmit game-related data, such as, for example, game account data, game input, game state data, and game displays. The game networking system 108.2 may be accessed by the other components of system 100 either directly or via the network 106. The player 102 may use the client device 104 to access, send data to, and receive data from the social networking system 108.1 and/or the game networking system 108.2. In various example embodiments, the game networking system 108.2 may include an introduction mechanic that can introduce a player of the game networking system 108.2 to other players of the game networking system 108.2 that are encountering a common in-game obstacle.

Although FIG. 1 illustrates a particular example of the arrangement of the player 102, the client device 104, the social networking system 108.1, the game networking system 108.2, and the network 106, this disclosure includes any suitable arrangement or configuration of the player 102, the client device 104, the social networking system 108.1, the game networking system 108.2, the advertising system 108.n, and the network 106.

Figure 2:
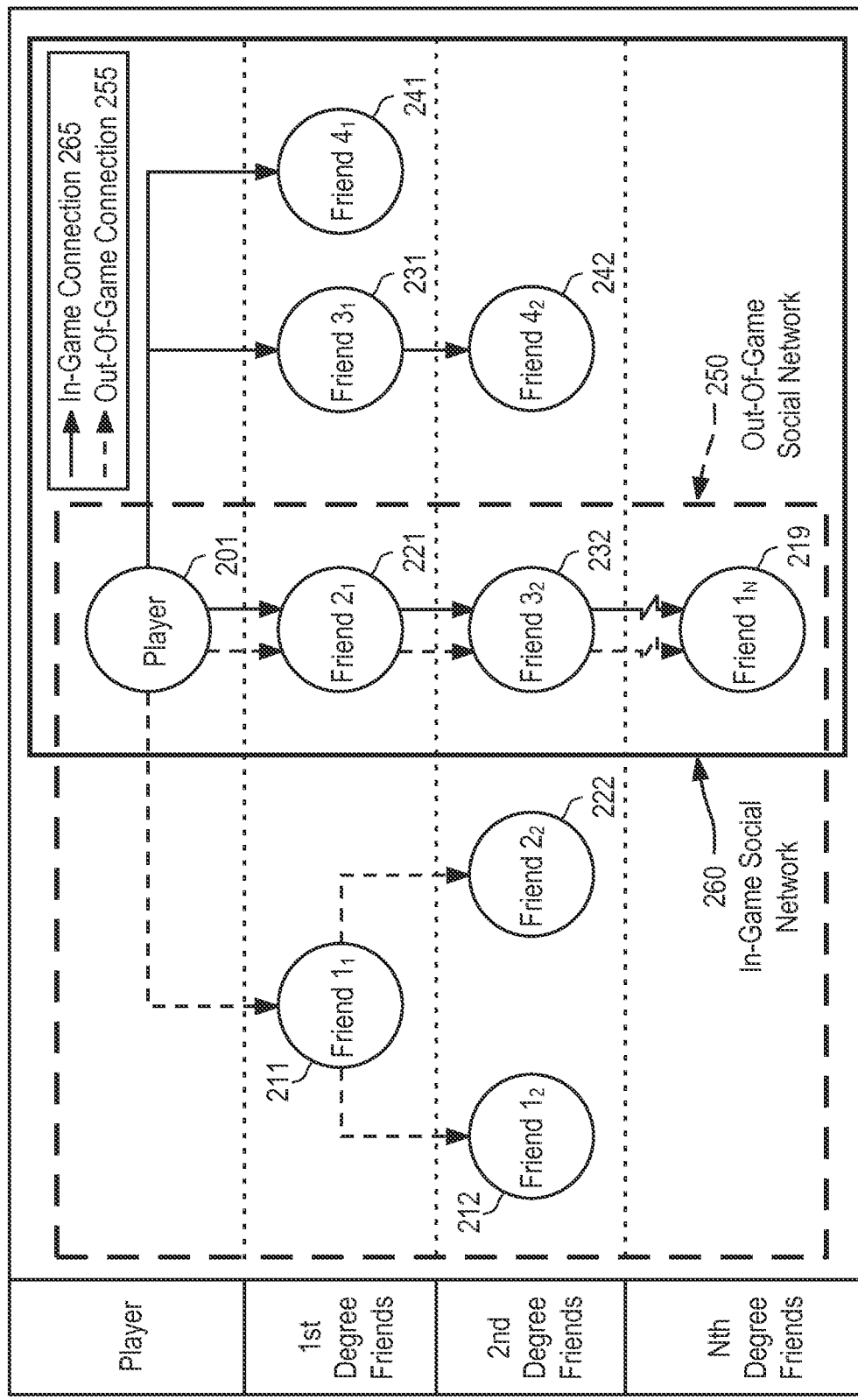
FIG. 2 shows an example of a social network within a social graph.

FIG. 2 shows an example of a social network within a social graph 200. Social graph 200 is shown by way of example to include an out-of-game social network 250, and an in-game social network 260. Moreover, in-game social network 260 may include one or more players that are friends with Player 201 (e.g., Friend 231), and may include one or more other players that are not friends with Player 201. The social graph 200 may correspond to the various players associated with the virtual game. In an example embodiment, each player may "build" their own virtual structures using branded virtual objects and/or unbranded virtual objects. When, for example, Player 201 visits the virtual environment of Friend 231, the virtual environment displayed to Player 201 includes banded objects selected and placed in that environment by Friend 231.

Generating User Profile and Customizing Ads Based on the User Profile

In an example system, a user profile may be generated by analyzing user preferences, in-game experiment results and user interactions, personality traits, social behavior, purchase habits and other characteristics. Based on the user profile, an ad may be selected and customized before presenting it to the user.

In an example embodiment, a database may be provided to store a user's profile. Any other suitable data structure may also be used to store the user profile. A weight factor may also be assigned to various information based on the importance of the information, In another example embodiment, an ad customization module may be provided to select and customize ads based on user profiles. This module may also determine ad placement, for example, within a virtual game environment. An ad database containing various configurations of specific ads may be provided as well.

Figure 3:
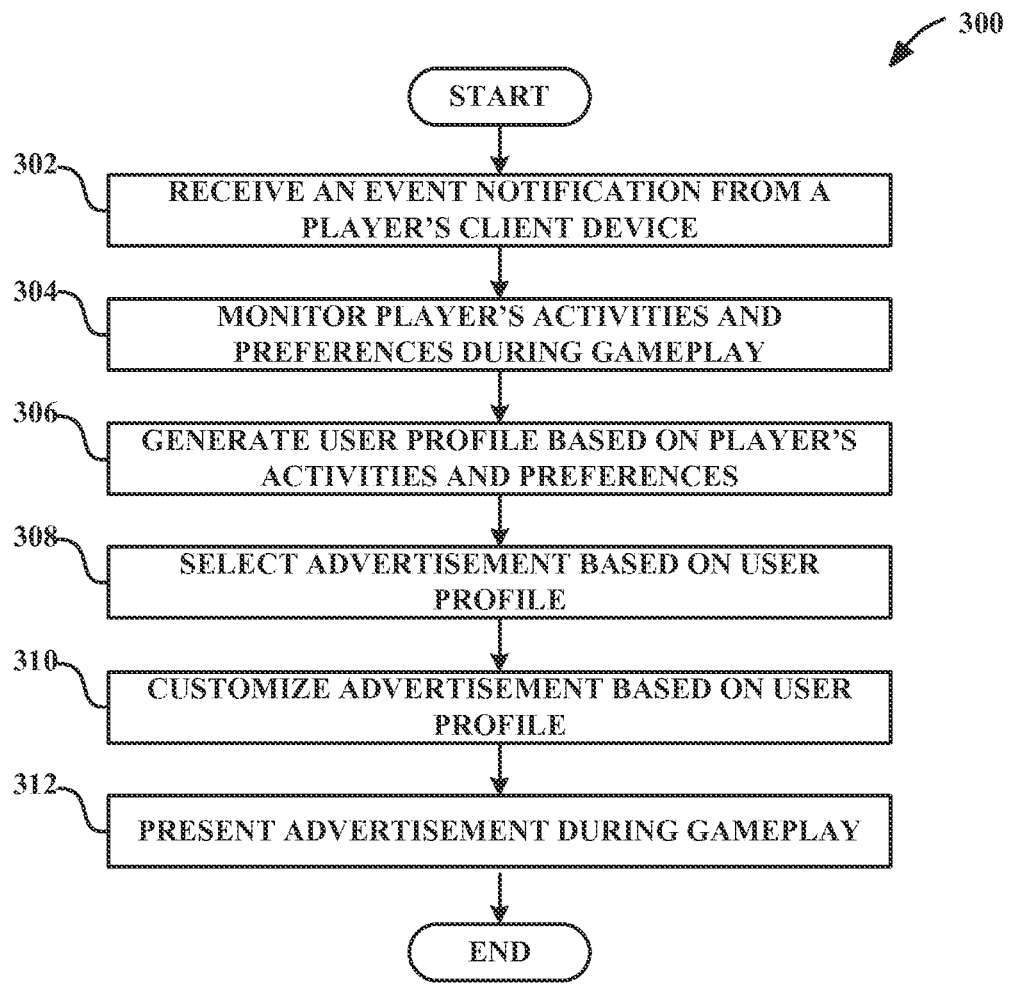
FIG. 3 shows a flowchart illustrating an example method for targeting advertisements based on individual behavior within a virtual gaming environment, according to some embodiments.

FIG. 3 shows a flowchart illustrating an example method 300 for targeting advertisement based on individual user behavior within a gaming environment. In some embodiments, method 300 may be performed using the advertising system 108.n. The method 300 may begin at operating 302 by receiving an event notification from a player's device, The method may then monitor the player's activities, preferences and/or behavior within the gaming environment at operation 304. At operation 306, the method may generate a user profile based on the player's activities, preferences and/or behavior. At operation 308, the method may select an advertisement based on the user profile. The selected advertisement may be customized based on the user profile, at operation 310. The customized advertisement may be presented or displayed during gameplay at operation 312.

Figure 4:
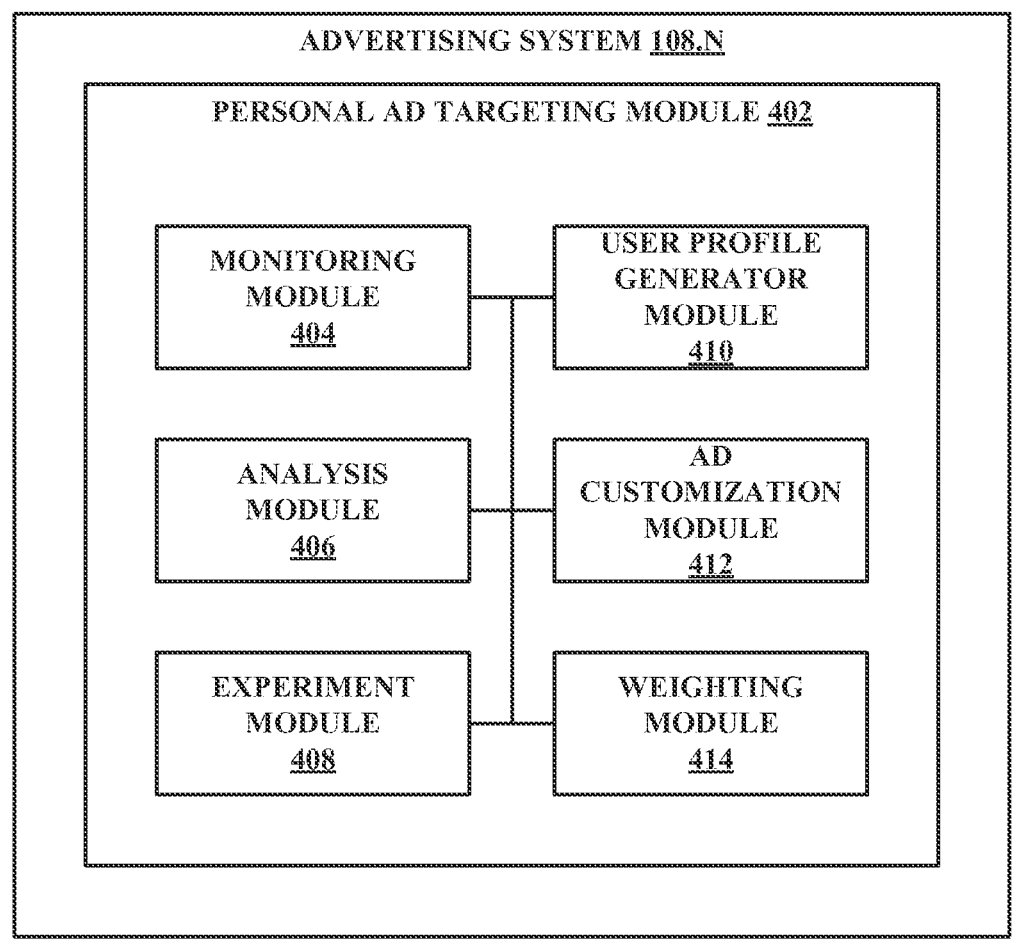
FIG. 4 is a block diagram illustrating example modules of a personal ad targeting system for selecting advertisements based on individual behavior within a virtual gaming environment, according to some embodiments.

FIG. 4 is a block diagram illustrating example modules of a personal ad targeting system for selecting advertisements based on individual behavior within a virtual gaming environment, according to some embodiments. A personal ad targeting module 402, shown to be part of the advertising system 108.n in FIG. 4, may include a monitoring module 404, an analysis module 406, an experiment module 408, a user profile generator module 410, an ad customization module 412, and a weighting module 414. In some embodiments, some or all of the modules of the personal ad targeting module 402 may be part of the game networking system 108.2. The modules may be hardware, software, or a combination of hardware and software. In some embodiments, the modules may be implemented by one or more processors of a system (e.g., one or more servers), such the advertising system 108.n or the game networking system 108.2. The modules of the personal ad targeting module 402 are described in further detail with reference to the various factors that influence the selection of an advertisement for a particular individual.

User Preferences, Characteristics and Behavior

In some example embodiments, the monitoring module 404 monitors events and user interactions that occur in the game networking system 108.2. Monitoring of events and user interactions may entail receiving or tracking data (in the form of, for example, data packets, cookies, web beacons, tracking pixels, and shared local objects) from the game networking system 108.2. From these monitored events and interactions, the analysis module 406 extracts and/or determines user preferences and characteristics, such as a color preference. For example, color preference may be determined by the analysis module 406 from the color of avatar costumes or the color of virtual objects selected by the user, as monitored by the monitoring module 404. The color preference may also be determined from a user's purchase history that is monitored or tracked by the monitoring module 404. For example, a user may purchase items in the color blue more often than items in other colors. A user's color preference may also depend on an object's characteristics. For example, a user may prefer blue for an avatar costume, but may prefer red for accessories. Further, a user may prefer black over white while purchasing items available only in black or white. A user may also prefer light colors over dark colors, or bold colors over neutrals.

The preferences and characteristics identified by the analysis module 406 may be passed to the ad customization module 412 for use in selecting and delivering an ad with a background in the user's preferred color. For example, if the user prefers blue, then the ad may have a blue background or blue border. If the user prefers to buy items available in black, then the ad customization module 412 may display an ad with an item available in black. For example, if an ad for a car is displayed, then a black car may be displayed. Thus, a color preference of a user may be determined based on interactions between the user and a computing device and ads may then be configured and presented to a user based on the determined color preference.

The weighting module 414 may assign weight factors to user preferences and characteristics. The weight factors may indicate the importance of the specific preference or characteristic. For example, if it is determined that a user prefers bold colors and the color blue, then bold colors may be assigned a heavier weight factor than the color blue. The ad customization module 412 may use the weight factors to influence the selection of an ad. For example, with reference to the example embodiment described above, the ad customization module 412 may select an ad that has bold colors instead of blue because the preference of bold colors has a higher weight factor.

In some example embodiments, user preferences, characteristics or behavior may be determined based on user actions taken when a user plays a virtual game. For example, the monitoring module 404 records the time and date the user plays. A user may also play only certain days of the week, or certain weeks of the month. The ad customization module 412 may deliver different ads for display depending on the time the user plays the game. The customization based on time may be performed in addition to, or instead of, other customizations (e.g., color).

The monitoring module 404 also may monitor the amount of time a user spends playing games. It may be determined that a user is not time-conscious and does not value his time. An ad for an item that helps saves a person's time, for example a fast-cooking stove, may not be displayed for such a user. Another user may be interested in interior decorating. The ad customization module 412 may display an ad for decorative clocks or other decorative items. Thus, the ad customization module 412 may select and customize ads based on the user's preferences, characteristics or behavior.

Example In-game Experiments

In some example embodiments, the experiment module 408 develops and conducts in-game experiments to determine user responsiveness or preferences. For example, during gameplay various dialogues may be displayed and the user's response to the dialogue may be recorded and analyzed by the monitoring module 404. The dialogues may be displayed in a separate dialogue box that pops-up on a display screen during game play. The dialogue may also be displayed as a scrolling text on the screen or may be displayed by flashing the text on the screen. This experiment may determine user's response to specific words and displaying technique of the words. The dialogues may also be displayed in different fonts, font size, and font styles bold, underline, etc.).

Based on the results of such experiments and user's interactions with the system, the ad customization module 412 may customize ads for an individual user. For example, if an individual user responded well to scrolling text, then the ad may be customized to contain scrolling text. If a user responded well to certain words and certain font styles then the ad may be customized to contain those words and font styles.

The experiment module 408 also may place virtual objects on the screen at various positions and record user's response to various placements. For example, a virtual object may be placed at the top of the screen instead of the bottom to determine visual response to the top of the screen. The objects may be displayed as pop-ups or embedded within the game as well.

Based on the results of experiments and user interactions with the system, the ad customization module 412 may deliver ads to be placed at a particular position on the screen. For example, if a user responded well to objects placed at the bottom of the screen, then ads may be displayed at the bottom of the screen.

The experiment module 408 may develop another in-game experiment that uses different colors for displaying objects and record the user's response to various colors. For example, a virtual object may be displayed in blue and red. A user may select or pay attention to the blue object over the red object, and this response may be recorded. Based on the results of this experiment, the ad customization module 412 may display an ad in a color that the user prefers. Thus, a user profile may include information based on the user's interaction with the system during gameplay and/or user's response to in-game experiments, and ads may be selected and customized based on the user profile.

Personality

In some example embodiments, a user's "personality" may influence the ads selected for a user. A user's personality may be determined by the analysis module 406 based on the user behavior, preferences or characteristics monitored by the monitoring module 404 during gameplay. For example, in the virtual game FarmVille by Zynga, Inc., a user may quickly harvest his farm and play at a regular frequency so that he can move up on the leader board. Based on this behavior, the analysis module 406 may classify the user as having a competitive personality. In another example, a user may spend more time in laying out the farm instead of harvesting the farm. The analysis module 406 may classify such a user as having an artistic personality. Such a user may also spend more money to acquire Objects of certain color and design so that they aesthetically fit into the farm layout. Another user may spend more time chatting with his friends on the virtual gaming system instead of playing the game. The analysis module 406 may classify such a user as having a social personality. In another example, the analysis module 406 may classify a user who likes to collect certain game items as a collector. Such a user may also collect stamps or other objects. A user may also be classified as having more than one personality. Based on the frequency of behavioral traits, the weighting module 414 may assign a heavier weight to one personality than another. These weight factors may be considered when the user profile generator module 410 generates a user profile and when the ad customization module 412 customizes ads for display. In an example embodiment, the user profile generated by the user profile generator module 410 in response to the user's in-game activities may be a complex vector that is based on a plurality of characteristics determined in the background during game interactions.

In an example embodiment, the user personality may be used to customize ads. For example, for a user having a social personality, a message may be displayed with an ad, and the message may state that "It is John's birthday. Would you like to buy a gift?" John may be the user's friend that he chats with often. In another example, if the user has an artistic personality, then an ad for artistic items may be displayed, and a collector may view ads for limited edition items.

Social Behaviors

In some example embodiments, a user profile may include the user's social behaviors. For example, a user may be a leader or a follower. A leader may be a user that acts on his own during gameplay, while a follower may rely on his friends to make his next move in the game (e.g., monitor what his friends are doing). A user may also make bold moves during gameplay or a user may be impulsive. Thus, personality traits of a user may be determined based on in-game interactions.

For example, the ad customization module 414 may deliver or present an ad for display to a leader before displaying it to a follower. The ad displayed may also be customized based on the personality traits of the particular user.

Purchase Habits

In some example embodiments, the user profile may include user's purchase habits and past purchase data. The past purchases by a user may be analyzed by the analysis module 406 to determine a price comfort level. For example, a user may have bought multiple hair accessories, and she paid a certain maximum price and minimum price. The price comfort level may be between the maximum and minimum price paid or it may be the average of the price paid. Accordingly, in an example embodiment, the system may interface with an online market (e.g., an online seller of goods and/or services) to retrieve purchase histories, item prices and descriptions, and item price ranges.

In another example, the user's purchase habits may include the number of times a user was exposed to an ad before buying an item. For example, the user may have seen an ad for a book 5 times, and the user bought the book when the ad was displayed the sixth time. Accordingly, the monitoring module 404 may monitor the ads presented to the user over a time period and any user interactions or responses to the presented ads.

In another example embodiment, the analysis module 406 may determine from a user's interactions that the user only purchases items that are discounted. This purchase habit may also be used when the user profile generator module 410 generates a user profile. Another user may only purchase items after one or more of his friends have purchased the item. On the other hand, a user may not take into consideration a friend's purchases while deciding to purchase an item. Accordingly, in an example embodiment, the monitoring module 404 may monitor purchases by a plurality of users in a social network or gaming network.

The ad customization module 412 may deliver ads with items that are within the user's price comfort level. If a user needs to see an ad a few times before buying, then the ad customization module 412 may continue to display the ad for the user. In another example, if the user prefers to purchase discounted items, then only ads with discounts may be displayed. If user only purchases items after his friends have purchased it, then an ad may be displayed to the user's friend first. Thus, in an example embodiment, ads are customized based on a user's buying habits in addition to, or instead of, other user characteristics/preferences described herein (e.g., color preferences, time preferences, and so on).

Ad Delivery Based on User Interactions and Behavior

Figure 5:
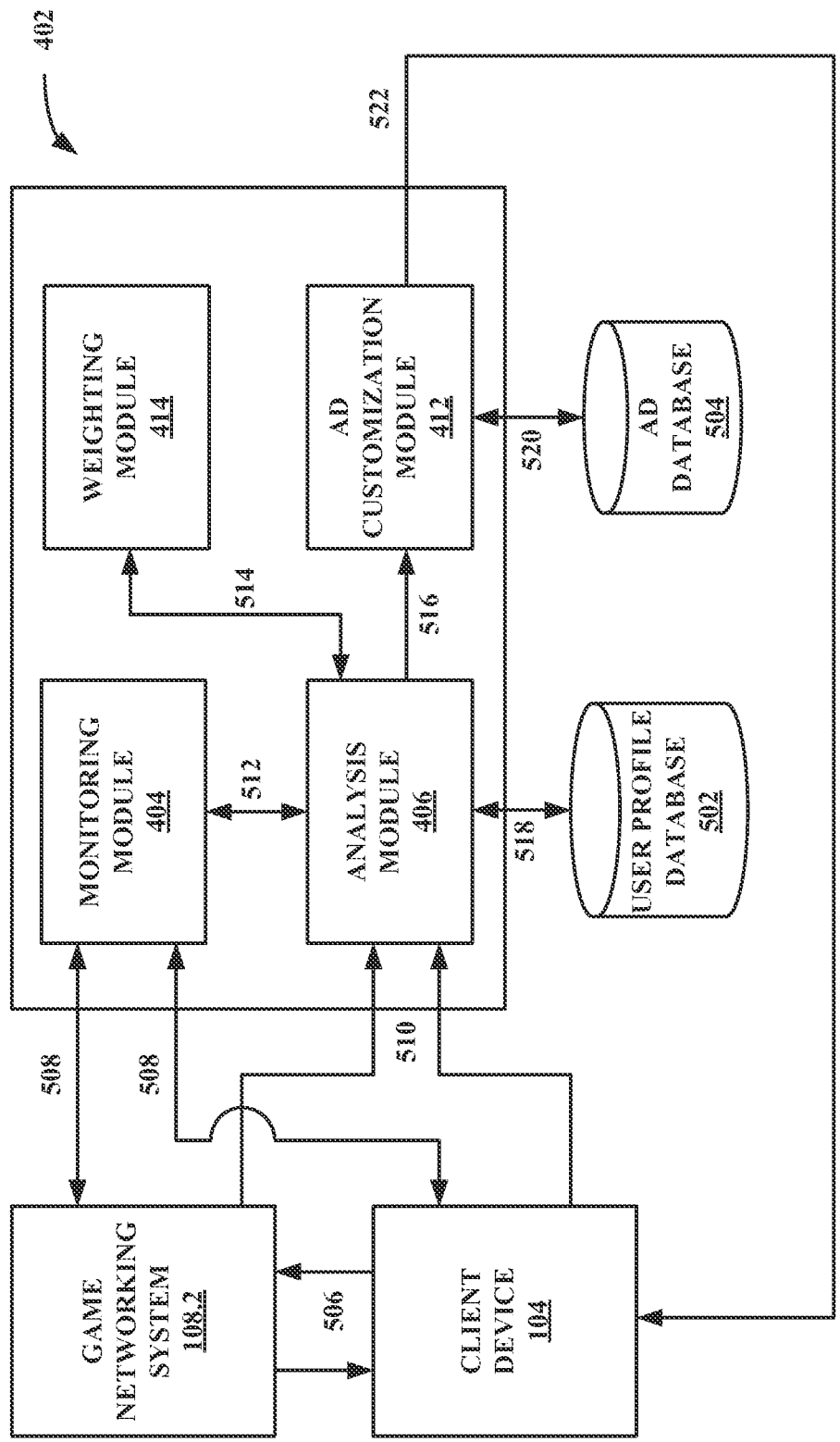
FIG. 5 is a block diagram illustrating example interactions between a client device and a personal ad targeting system, according to some embodiments.

FIG. 5 is a diagram illustrating example interactions and data flow between a client device, a game networking system, and a personal ad targeting system, according to some embodiments. A client device 104 may interact with a game networking system 108.2 to exchange data (represented by element 504) corresponding to game actions, game states, and so forth. In some embodiments, data exchanged between the client device 104 and the game networking system 108.2 may be monitored by the monitoring module 404 of FIG. 4. Monitoring may be enabled via data gathered from cookies, web beacons, tracking pixels, local shared objects, and so forth that reside on the client device 104. In some embodiments, the monitoring module 404 may have access to the game networking system 108.2 to retrieve user-related data sent from the client device 104. As discussed above with reference to FIGS. 3 and 4, various user actions and behaviors, including user game actions, user purchasing behavior, user responses and interactions with ads, experiments, and other stimuli may be monitored by the monitoring module 404. If the monitoring module 404 is able to gather data from the client device 104 and/or the game networking system 108.2, the monitoring module 404 may transmit the gathered data to the analysis module 406, as depicted by element 512. If the monitoring module 404 is unable to gather data from the client device 104 and/or the game networking system 108.2, in some embodiments, the client device 104 and/or the game networking system 108.2 may transmit that data to the monitoring module 404, as depicted by element 508, or to the analysis module 406, as depicted by element 510. In some embodiments, the client device 104 and/or the game networking system 108.2 may transmit data to the analysis module 406 irrespective of whether such data is capable of being monitored by the monitoring module 404.

The analysis module 406 processes the data received from the monitoring module 404, the client device 104, and/or the game networking system 108.2. From the data processing, the analysis module 406 may determine user preferences, user behaviors, user purchasing decisions, user personality, user social interactions, and user interactions and responses to certain stimuli. The analysis module 406 may contain logic capable of determining user traits and preferences from observed user responses and interactions, either through inference, extraction, aggregation, or other data analysis techniques. For example, using the examples described herein, the analysis module 406 may infer user preferences based on user selections and actions (e.g., user selects characters or items of a certain color). The analysis module 406 also may infer other user traits from user response times or user reactions to certain stimuli, such as experiments, ads, in-game elements or situations, and so forth.

As the analysis module 406 receives more data to analyze about a user's preferences, the analysis module 406 may update a user profile corresponding to the user, assuming a user profile exists. The analysis module 406 may search a user profile database 502 for a user profile corresponding to the user, as depicted by element 518. If the user profile does not exist, a user profile generator module 410 (not shown in FIG. 5) may create a user profile and store the user profile in the user profile database 502, also as depicted by element 518. If the user profile exists, the analysis module 406 may update data contained in the user profile to reflect changing or augmented user characteristics (e.g., behavior, preferences, traits, personalities, purchasing preferences and behavior, social interactions). In some embodiments, based on analyzed user data, the analysis module 406 may interface (as depicted by element 514) with the weighting module 414 to assign or adjust weights to various user characteristics in an attempt to more accurately model a profile of the user.

In some embodiments, the ad customization module 412 may receive the updated user profile from the analysis module 406 or may receive updated analytical data concerning a user from the analysis module 406. In response thereto, the ad customization module 412 may use the user profile or user analytical data to retrieve a personalized advertisement from the ad database 504 (as depicted by element 520). In some embodiments, the ad customization module 412 may retrieve a generic or non-personalized ad from the ad database 504 and may customize the ad using the data or user profile obtained from the analysis module 406. For example, the ad customization module 412 may retrieve an ad from the ad database 504 and may customize the background color of the ad to reflect a color preference of the user that is determined from user data (e.g., user responses or interaction with various game and non-game elements) received from the client device 104 and/or the game networking system 108.2. The personalized ad may be provided to the client device 104 for presentation and display, as depicted by element 522.

Example Game Systems, Social Networks, and Social Graphs

In an online multiplayer game, players control player characters (PCs), a game engine controls non-player characters (NPCs), and the game engine also manages player character state and tracks states for currently active (e.g., online) players and currently inactive (e.g., offline) players. A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a player (or a group of more than one players), the game engine may take into account the state of the player character (or group of PCs) that is playing, but also the state of one or more PCs of offline/inactive players who are connected to the current player (or PC, or group of PCs) through the game social graph but are not necessarily involved in the game at the time.

For example, Player A with six friends on Player A's team (e.g., the friends that are listed as being in the player's mob/gang/set/army/business/crew/etc. depending on the nature of the game) may be playing the virtual game and choose to confront Player B who has 20 friends on Player B's team. In some embodiments, a player may only have first-degree friends on the player's team. In other embodiments, a player may also have second-degree and higher degree friends on the player's team. To resolve the game event, in some embodiments the game engine may total up the weapon strength of the seven members of Player A's team and the weapon strength of the 21 members of Player B's team and decide an outcome of the confrontation based on a random variable applied to a probability distribution that favors the side with the greater total. In some embodiments, all of this may be done without any other current active participants other than Player A (e.g., Player A's friends, Player, B, and Player B's friends could all be offline or inactive). In some embodiments, the friends in a player's team may see a change in their state as part of the outcome of the game event. In some embodiments, the state (assets, condition, level) of friends beyond the first degree are taken into account.

Example Game Networking Systems

A virtual game may be hosted by the game networking system 108.2, which can be accessed using any suitable connection 110 with a suitable client device 104. A player may have a game account on the game networking system 108.2, wherein the game account may contain a variety of information associated with the player (e.g., the player's personal information, financial information, purchase history, player character state, game state, etc.). In some embodiments, a player may play multiple games on the game networking system 108.2, which may maintain a single game account for the player with respect to the multiple games, or multiple individual game accounts for each game with respect to the player. In some embodiments, the game networking system 108.2 may assign a unique identifier to a player 102 of a virtual game hosted on the game networking system 108.2. The game networking system 108.2 may determine that the player 102 is accessing the virtual game by reading the user's cookies, which may be appended to HTTP requests transmitted by the client device 104, and/or by the player 102 logging onto the virtual game.

In some embodiments, the player 102 accesses a virtual game and controls the game's progress via the client device 104 (e.g., by inputting commands to the game at the client device 104). The client device 104 can display the game interface, receive inputs from the player 102, transmit user inputs or other events to the game engine, and receive instructions from the game engine. The game engine can be executed on any suitable system (such as, for example, the client device 104, the social networking system 108.1, or the game networking system 108.2). For example, the client device 104 may download client components of a virtual game, which are executed locally, while a remote game server, such as the game networking system 108.2, provides backend support for the client components and may be responsible for maintaining application data of the game, processing the inputs from the player 102, updating and/or synchronizing the game state based on the game logic and each input from the player 102, and transmitting instructions to the client device 104. As another example, when the player 102 provides an input to the game through the client device 104 (such as, for example, by typing on the keyboard or clicking the mouse of the client device 104), the client components of the game may transmit the player's input to the game networking system 108.2.

In some embodiments, the player 102 accesses particular game instances of a virtual game. A game instance is a copy of a specific game play area that is created during runtime. In some embodiments, a game instance is a discrete game play area where one or more players 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific players. A game instance is associated with a specific player when one or more game parameters of the game instance are associated with the specific player. For example, a game instance associated with a first player may be named "First Player's Play Area." This game instance may be populated with the first player's and one or more in-game objects associated with the first player.

In some embodiments, a game instance associated with a specific player is only accessible by that specific player. For example, a first player may access a first game instance when playing a virtual game, and this first game instance may be inaccessible to all other players. In other embodiments, a game instance associated with a specific player is accessible by one or more other players, either synchronously or asynchronously with the specific player's game play. For example, a first player may be associated with a first game instance, but the first game instance may be accessed by all first-degree friends in the first player's social network.

In some embodiments, the set of in-game actions available to a specific player is different in a game instance that is associated with this player compared to a game instance that is not associated with this player. The set of in-game actions available to a specific player in a game instance associated with this player may be a subset, superset, or independent of the set of in-game actions available to this player in a game instance that is not associated with him. For example, a first player may be associated with Blackacre Farm in an online farming game, and may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In some embodiments, a game engine interfaces with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a player or player character in an online multiplayer game.

In some embodiments, the social graph is managed by the game networking system 108.2, which is managed by the game operator. In other embodiments, the social graph is part of a social networking system 108.1 managed by a third party (e.g., Facebook, Friendster, and/or Myspace). In yet other embodiments, the player 102 has a social network on both the game networking system 108.2 and the social networking system 108.1, wherein the player 102 can have a social network on the game networking system 108.2 that is a subset, superset, or independent of the player's social network on the social networking system 108.1. In such combined systems, game network system 108.2 can maintain social graph information with edge-type attributes that indicate whether a given friend is an "in-game friend," an "out-of-game friend," or both. The various embodiments disclosed herein are operable when the social graph is managed by the social networking system 108.1, the game networking system 108.2, or both.

Example Systems and Methods

Returning to FIG. 2, the Player 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to Player 201. As used herein, the terms "player" and "user" can be used interchangeably and can refer to any user in an online multiuser game system or social networking system. As used herein, the term "friend" can mean any node within a player's social network.

As shown in FIG. 2, Player 201 has direct connections with several friends. When Player 201 has a direct connection with another individual that connection is referred to as a first-degree friend. In out-of-game social network 250, Player 201 has two first-degree friends. That is, Player 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a player to another user is considered the degree of separation. For example, FIG. 2 shows that Player 201 has three second-degree friends to which Player 201 is connected via Player 201's connection to Player 201's first-degree friends. Second-degree Friend $1_2$ 212 and Friend $2_2$ 222 are connected to Player 201 via Player 201's first-degree Friend $1_1$ 211. The limit on the depth of friend connections, or the number of degrees of separation for associations, that Player 201 is allowed is typically dictated by the restrictions and policies implemented by the social networking system 108.1.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_2$ 232 and one or more other higher-degree friends.

In some embodiments, a player (or player character) has a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in Player 201's out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in Player 201's in-game social network 260. In some embodiments, a game engine can access in-game social network 260, out-of-game social network 250, or both.

In some embodiments, the connections in a player's in-game social network are formed both explicitly (e.g., when users "friend" each other) and implicitly (e.g., when the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (e.g., in &intermediated interactions or the like), but that could be the case.

Figure 6:
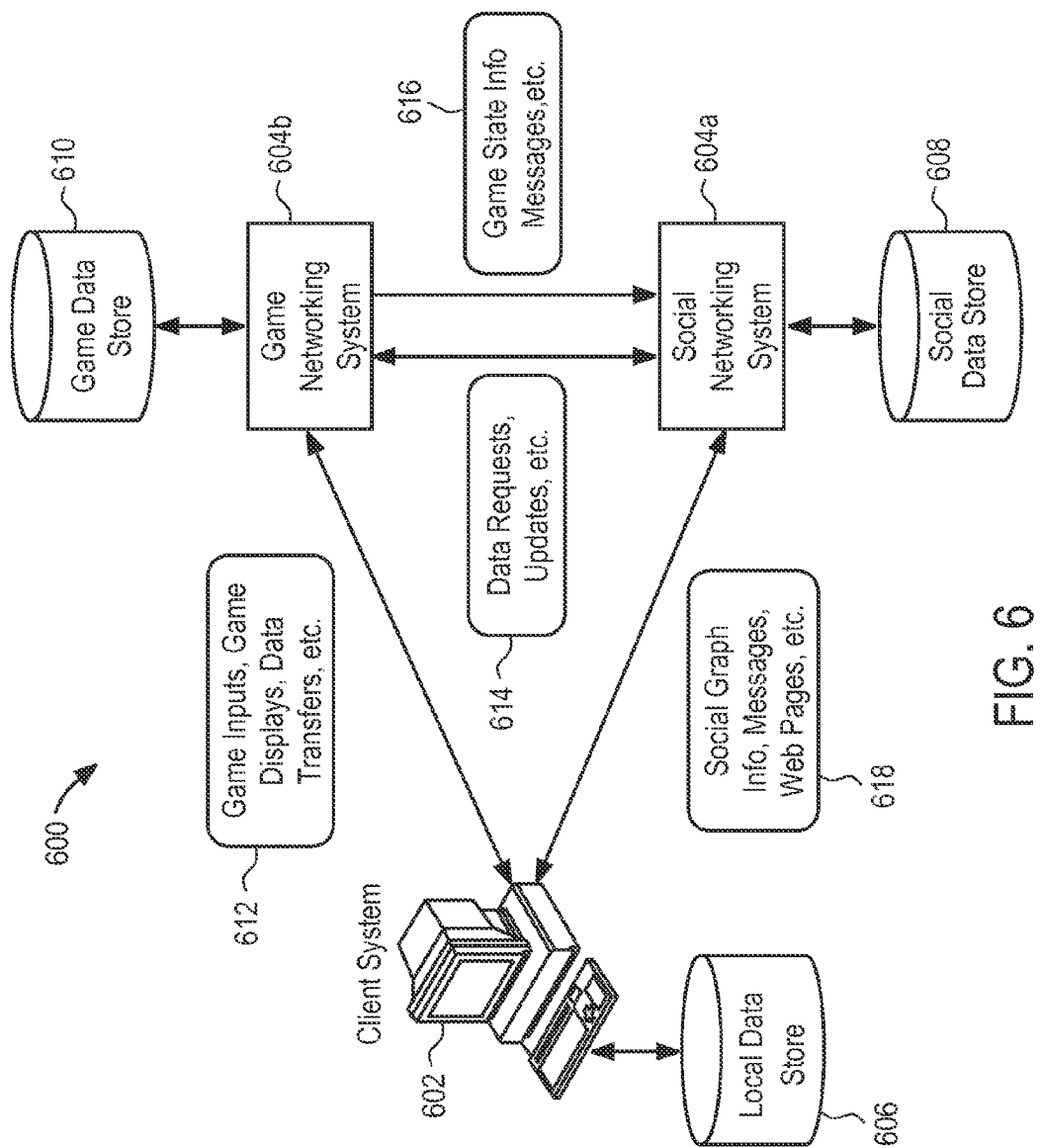
FIG. 6 illustrates an example of data flow between example components of the example system of FIG. 1, according to some embodiments.

FIG. 6 illustrates an example data flow between example components of an example system 600. One or more of the components of the example system 600 may correspond to one or more of the components of the example system 100. In some embodiments, system 600 can include a client system 602, a social networking system 604a, and a game networking system 604b. The components of system 600 can be connected to each other in any suitable configuration, using any suitable type of connection. The components may be connected directly or over any suitable network. The client system 602, the social networking system 604*a*, and the game networking system 604*b* may have one or more corresponding data stores such as the local data store 606, the social data store 608, and the game data store 610, respectively.

The client system 602 may receive and transmit data 612 to and from the game networking system 604*b*. This data can include, for example, a web page, a message, a game input, a game display, a HTTP packet, a data request, transaction information, and other suitable data. At some other time, or at the same time, the game networking system 604*b* may communicate data 614, 616 (e.g., game state information, game system account information, page info, messages, data requests, updates, etc.) with other networking systems, such as the social networking system 604*a* (e.g., Facebook, Myspace, etc.). The client system 602 can also receive and transmit data 618 to and from the social networking system 604*a*. This data can include, for example, web pages, messages, social graph information, social network displays, HTTP packets, data requests, transaction information, updates, and other suitable data.

Communication between the client system 602, the social networking system 604*a*, and the game networking system 604*b* can occur over any appropriate electronic communication medium or network using any suitable communications protocols. For example, the client system 602, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game can be stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a player accesses a virtual game on the game networking system 404*b*, the BLOB containing the game state for the instance corresponding to the player may be transmitted to the client system 602 for use by a client-side executed object to process. In some embodiments, the client-side executable may be a FLASH-based game, which can de-serialize the game state data in the BLOB. As a player plays the game, the game logic implemented at the client system 602 maintains and modifies the various game state parameters locally.

The client-side game logic may also batch game events, such as mouse clicks, and transmit these events to the game networking system 604*b*. Game networking system 604*b* may itself operate by retrieving a copy of the BLOB from a database or an intermediate memory cache (memcache) layer. The game networking system 604*b* can also de-serialize the BLOB to resolve the game state parameters and execute its own game logic based on the events in the batch file of events transmitted by the client to synchronize the game state on the server side. The game networking system 604*b* may then re-serialize the game state, now modified into a BLOB, and pass this to a memory cache layer for lazy updates to a persistent database.

In some embodiments, a computed-implemented game may be a text-based or turn-based game implemented as a series of web pages that are generated after a player selects one or more actions to perform. The web pages may be displayed in a browser client executed on the client system 602. For example, a client application downloaded to the client system 602 may operate to serve a set of web pages to a player. As another example, a virtual game may be an animated or rendered game executable as a stand-alone application or within the context of a webpage or other structured document. In some embodiments, the virtual game may be implemented using Adobe Flash-based technologies. As an example, a game may be fully or partially implemented as a SWF object that is embedded in a web page and executable by a Flash media player plug-in. In some embodiments, one or more described web pages may be associated with or accessed by the social networking system 604*a*. This disclosure contemplates using any suitable application for the retrieval and rendering of structured documents hosted by any suitable network-addressable resource or website.

Application event data of a game is any data relevant to the game (e.g., player inputs). In some embodiments, each application datum may have a name and a value, and the value of the application datum may change (e.g., be updated) at any time. When an update to an application datum occurs at the client system 602, either caused by an action of a game player or by the game logic itself, the client system 602 may need to inform the game networking system 604*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies.

In some embodiments, one or more objects of a game may be represented as an Adobe Flash object. Flash may manipulate vector and raster graphics, and supports bidirectional streaming of audio and video. "Flash" may mean the authoring environment, the player, or the application files. In some embodiments, the client system 602 may include a Flash client. The Flash client may be configured to receive and run Flash application or game object code from any suitable networking system (such as, for example, the social networking system 604*a* or the game networking system 604*b*). In some embodiments, the Flash client may be run in a browser client executed on the client system 602. A player can interact with Flash objects using the client system 602 and the Flash client. The Flash objects can represent a variety of in-game objects. Thus, the player may perform various in-game actions on various in-game objects by making various changes and updates to the associated Flash objects.

In some embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In some embodiments, when the player makes a change to a Flash object representing an in-game object, the client-executed game logic may update one or more game state parameters associated with the in-game object. To ensure synchronization between the Flash object shown to the player at the client system 602, the Flash client may send the events that caused the game state changes to the in-game object to the game networking system 604*b*. However, to expedite the processing and hence the speed of the overall gaming experience, the Flash client may collect a batch of some number of events or updates into a batch file. The number of events or updates may be determined by the Flash client dynamically or determined by the game networking system 604*b* based on server loads or other factors. For example, client system 602 may send a batch file to the game networking system 604*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to player data or metadata, changes to player social connections or contacts, player inputs to the game, and events generated by the game logic. In some embodiments, each application datum may have a name and a value. The value of an application datum may change at any time in response to the game play of a player or in response to the game engine (e.g., based on the game logic). In some embodiments, an application data update occurs when the value of a specific application datum is changed.

In some embodiments, when a player plays a virtual game on the client system 602, the game networking system 604*b* may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular virtual game. In some embodiments, while a player is not playing the virtual game, the corresponding BLOB may be stored in the database. This enables a player to stop playing the game at any time without losing the current state of the game the player is in. When a player resumes playing the game next time, game networking system 604*b* may retrieve the corresponding BLOB from the database to determine the most-recent values of the game-related data. In some embodiments, white a player is playing the virtual game, the game networking system 604*b* may also load the corresponding BLOB into a memory cache so that the game system may have faster access to the BLOB and the game-related data contained therein.

Figure 7:
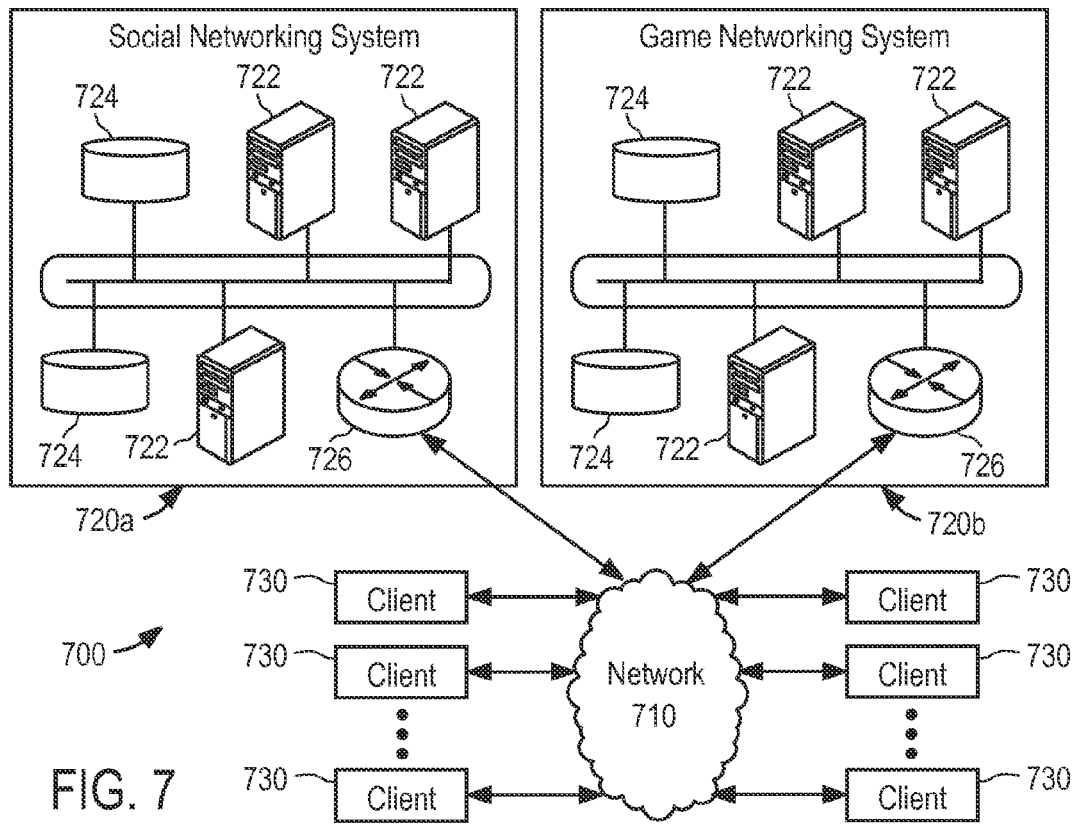
FIG. 7 illustrates an example network environment, in which various example embodiments may operate.

Various embodiments may operate in a wide area network environment, such as the Internet, including multiple network addressable systems. FIG. 7 illustrates an example network environment 700, in which various example embodiments may operate. Network cloud 710 generally represents one or more interconnected networks, over which the systems and hosts described herein can communicate. Network cloud 710 may include packet-based wide area networks (such as the Internet), private networks, wireless networks, satellite networks, cellular networks, paging networks, and the like. As FIG. 7 illustrates, various embodiments may operate in a network environment 700 comprising one or more networking systems, such as a social networking system 720*a*, a game networking system 720*b,* and one or more client systems 730. The components of the social networking system 720*a* and the game networking system 720*b* operate analogously; as such, hereinafter they may be referred to simply as the networking system 720. The client systems 730 are operably connected to the network environment 700 via a network service provider, a wireless carrier, or any other suitable means.

The networking system 720 is a network addressable system that, in various example embodiments, comprises one or more physical servers 722 and data stores 724. The one or more physical servers 722 are operably connected to computer network cloud 710 via, by way of example, a set of routers and/or networking switches 726. In an example embodiment, the functionality hosted by the one or more physical servers 722 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 722 may host functionality directed to the operations of the networking system 720. Hereinafter servers 722 may be referred to as server 722, although the server 722 may include numerous servers hosting, for example, the networking system 720, as well as other content distribution servers, data stores, and databases. Data store 724 may store content and data relating to, and enabling, operation of, the networking system 720 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, data store 724 corresponds to one or more of a variety of separate and integrated databases, such as relational databases and object-oriented databases that maintain information as an integrated collection of logically related records or files stored on one or more physical systems. Structurally, data store 724 may generally include one or more of a large class of data storage and management systems. In some embodiments, data store 724 may be implemented by any suitable physical system(s) including components, such as one or more database servers, mass storage media, media library systems, storage area networks, data storage clouds, and the like. In one example embodiment, data store 724 includes one or more servers, databases (e.g., MySQL), and/or data warehouses. Data store 724 may include data associated with different networking system 720 users and/or client systems 730.

The client system 730 is generally a computer or computing device including functionality for communicating (e.g., remotely) over a computer network. The client system 730 may be a desktop computer, laptop computer, personal digital assistant (FDA), in- or out-of-car navigation system, tablet computing device, smart phone or other cellular or mobile phone, or mobile gaming device, among other suitable computing devices. Client system 730 may execute one or more client applications, such as a Web browser.

When a user at a client system 730 desires to view a particular webpage (hereinafter also referred to as target structured document) hosted by the networking system 720, the user's web browser, or other document rendering engine or suitable client application, formulates and transmits a request to the networking system 720. The request generally includes a URL or other document identifier as well as metadata or other information. By way of example, the request may include information identifying the user, a timestamp identifying when the request was transmitted, and/or location information identifying a geographic location of the user's client system 730 or a logical network location of the user's client system 730.

Although the example network environment 700 described above and illustrated in FIG. 7 is described with respect to the social networking system 720*a* and the game networking system 720*b,* this disclosure encompasses any suitable network environment using any suitable systems. For example, the network environment may include online media systems, online reviewing systems, online search engines, online advertising systems, or any combination of two or more such systems.

Figure 8:
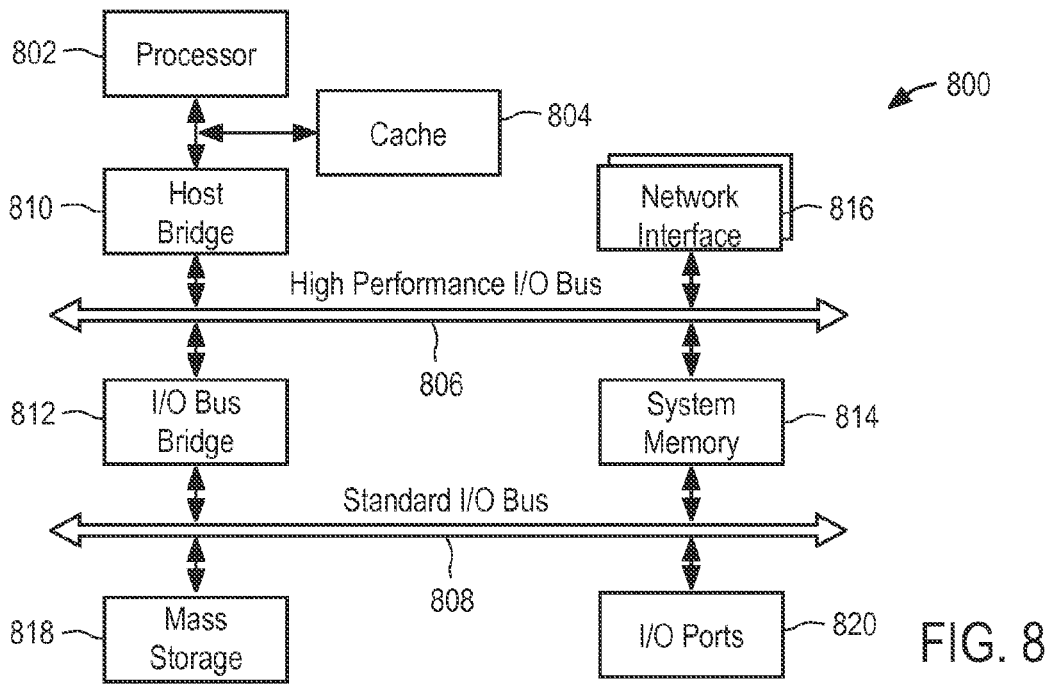
FIG. 8 illustrates an example computing system architecture, which may be used to implement one or more of the methodologies described herein.

FIG. 8 illustrates an example computing system architecture, which may be used to implement a server 722 or a client system 730. In one embodiment, the hardware system 800 comprises a processor 802, a cache memory 804, and one or more executable modules and drivers, stored on a tangible computer readable medium, directed to the functions described herein. Additionally, the hardware system 800 may include a high performance input/output (I/O) bus 806 and a standard I/O bus 808. A host bridge 810 may couple the processor 802 to the high performance I/O bus 806, whereas the I/O bus bridge 812 couples the two buses 806 and 808 to each other. A system memory 814 and one or more network/communication interfaces 816 may couple to the bus 806. The hardware system 800 may further include video memory (not shown) and a display device coupled to the video memory. Mass storage 818 and I/O ports 820 may couple to the bus 808. The hardware system 800 may optionally include a keyboard, a pointing device, and a display device (not shown) coupled to the bus 808, Collectively, these elements are intended to represent a broad category of computer hardware systems.

The elements of the hardware system 800 are described in greater detail below. In particular, the network interface 816 provides communication between the hardware system 800 and any of a wide range of networks, such as an Ethernet (e.g., IEEE 802.3) network, a backplane, etc. The mass storage 818 provides permanent storage for the data and programming instructions to perform the above-described functions implemented in servers 722 of FIG. 7, whereas system memory 814 (e.g., DRAM) provides temporary storage for the data and programming instructions when executed by the processor 802. I/O ports 820 are one or more serial and/or parallel communication ports that provide communication between additional peripheral devices, which may be coupled to the hardware system 800.

The hardware system 800 may include a variety of system architectures and various components of the hardware system 800 may be rearranged. For example, cache memory 804 may be on-chip with the processor 802. Alternatively, the cache memory 804 and the processor 802 may be packed together as a "processor module," with processor 802 being referred to as the "processor core." Furthermore, certain embodiments of the present disclosure may neither require nor include all of the above components. For example, the peripheral devices shown coupled to the standard I/O bus 808 may couple to the high performance I/O bus 806. In addition, in some embodiments, only a single bus may exist, with the components of the hardware system 800 being coupled to the single bus. Furthermore, the hardware system 800 may include additional components, such as additional processors, storage devices, or memories.

An operating system manages and controls the operation of the hardware system 800, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers, The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method for customizing advertisements for a user of an online game, the method comprising:
  receiving, from a client device of the user, data indicative of user interactions of the user within the online game;
  determining, based on the user interactions, one or more user characteristics of the user for a user profile of the user;
  selecting, by at least one processor, an advertisement based on the user profile;
  customizing, by the at least one processor, a color of at least a portion of content of the selected advertisement based on the user profile;

identifying a first particular number of display instances of a previously selected advertisement;

identifying that a final display instance of the previously selected advertisement resulted in a purchase request from the user profile;

customizing, based on the first particular number of display instances of the previously selected advertisement and the purchase request resulting from the final display instance, a second particular number of display instances the customized content of the selected advertisement will be displayed to the user; and providing the customized content of the selected advertisement for display within the online game.

2. The computer-implemented method of claim 1, wherein the user characteristics include at least one of a color preference of the user, a game personality of the user, a purchasing habit of the user, a user frequency of play of the online game, and a social behavior of the user.

3. The computer-implemented method of claim 1, further comprising:

generating an experiment to interact with the user within the online game;

causing the experiment to be presented within the online game;

receiving data indicative of a response from the user to the experiment; and determining a characteristic of the user based on the user response to the experiment.

4. The computer-implemented method of claim 1, further comprising:

generating a weight factor for each user characteristic, each weight factor having a value based on the user interactions; and applying each weight factor to the corresponding user characteristic, wherein the advertisement is selected and the content of the selected advertisement is customized using the weighted user characteristics.

5. The computer-implemented method of claim 1, wherein the user characteristics include a personality of the user, the personality of the user determined based on a frequency of user interactions with the online game and types of user interactions with the online game.

6. The computer-implemented method of claim 5, wherein the types of user interactions with the online game include user interactions with gameplay elements of the online game, user interactions with other users of the online game, and user interactions with aesthetic elements of the online game.

7. The computer-implemented method of claim 1, wherein the user characteristics include a purchasing profile of the user, the purchasing profile based on a monitored purchasing history of the user, and wherein the advertisement selected is for an item having a price within a price range of items contained in the monitored purchasing history of the user.

8. The computer-implemented method of claim 1, wherein customizing a color of at least a portion of content of the selected advertisement based on the user profile comprises at least:

changing, based on the user characteristics, a color of a particular portion of the content of the selected advertisement.

9. The computer-implemented method of claim 1, wherein determining, based on the user interactions, one or more user characteristics of the user for a user profile of the user comprises:

generating the user profile for the user based on the user characteristics.

10. A machine-readable storage medium containing a set of instructions that, when executed by at least one processor, causes the at least one processor to perform operations comprising:

receiving, from a client device of a user, data indicative of user interactions of the user within an online game;

determining, based on the user interactions, one or more user characteristics of the user for a user profile of the user;

selecting an advertisement based on the user profile;

customizing a color of at least a portion of content of selected advertisement based on the user profile;

identifying a first particular number of display instances of a previously selected advertisement;

identifying a final display instance of the previously selected advertisement resulted in a purchase request from the user profile;

customizing, based on the first particular number of display instances of the previously selected advertisement and the purchase request resulting from the final display, a second particular number of display instances the customized content of the selected advertisement will be displayed to the user; and providing the customized content of the advertisement for display within the online game.

11. The machine-readable storage medium of claim 10, wherein the user characteristics include at least one of a color preference of the user, a game personality of the user, a purchasing habit of the user, a user frequency of play of the online game, and a social behavior of the user.

12. The machine-readable storage medium of claim 10, further comprising:

generating an experiment to interact with the user within the online game;

causing the experiment to be presented within the online game;

receiving data indicative of a response from the user to the experiment; and determining a characteristic of the user based on the user response to the experiment.

13. The machine-readable storage medium of claim 10, further comprising:

generating a weight factor for each user characteristic, each weight factor having a value based on the user interactions; and applying each weight factor to the corresponding user characteristic, wherein the advertisement is selected and the content of the selected advertisement is customized using the weighted user characteristics.

14. The machine-readable storage medium of claim 10, wherein the user characteristics include a personality of the user, the personality of the user determined based on a frequency of user interactions with the online game and types of user interactions with the online game, wherein the types of user interactions with the online game include user interactions with gameplay elements of the online game, user interactions with other users of the online game, and user interactions with aesthetic elements of the online game.

15. The machine-readable storage medium of claim 10, wherein the user characteristics include a purchasing profile of the user, the purchasing profile based on a monitored purchasing history of the user, and wherein the advertisement selected is for an item having a price within a price range of items contained in the monitored purchasing history of the user.

16. A system comprising:

at least one processor;

a monitoring module implemented by the at least one processor and configured to monitor user interactions of a user within an online game; an analysis module implemented by the at least one processor and configured to determine, based on monitored user interactions, one or more user characteristics of the user for a user profile of the user;

an ad customization module implemented by the at least one processor and configured to select and customize a color of at least a portion of content of an advertisement based on the user profile containing the user characteristics, the customized content of the selected advertisement being provided for display within the online game; and a display customization module implemented by the at least one processor and configured to identify a first particular number of display instances of a previously selected advertisement and to identify a final display instance of the previously selected advertisement resulted in a purchase request from the user profile and further configured to customize, based on the first particular number of display instances of the previously selected advertisement and the purchase request resulting from the final display, a second particular number of display instances the customized content of the selected advertisement will be displayed to the user.

17. The system of claim 16, wherein the user characteristics include at least one of a color preference of the user, a game personality of the user, a purchasing habit of the user, a user frequency of play of the online game, and a social behavior of the user.

18. The system of claim 16, further comprising an experiment module configured to:

generate an experiment to interact with the user within the online game; and cause the experiment to be presented within the online game, wherein the monitoring module is further configured to receive data indicative of a response from the user to the experiment, and wherein the analysis module is further configured to determine a characteristic of the user based on the user response to the experiment.

19. The system of claim 16, further comprising a weighting module configured to:

generate a weight factor for each user characteristic, each weight factor having a value based on the monitored user interactions; and applying each weight factor to the corresponding user characteristic, wherein the ad customization module is configured to select the advertisement and customize the content of the selected advertisement using the weighted user characteristics.

20. The system of claim 16, wherein the user characteristics include a personality of the user, the personality of the user determined based on a frequency of user interactions with the online game and types of user interactions with the online game, wherein the types of user interactions with the online game include user interactions with gameplay elements of the online game, user interactions with other users of the online game, and user interactions with aesthetic elements of the online game.

21. The system of claim 16, wherein the user characteristics include a purchasing profile of the user, the purchasing profile based on a monitored purchasing history of the user, and wherein the advertisement selected is for an item having a price within a price range of items contained in the monitored purchasing history of the user.

22. The system of claim 16, further comprising a user profile generator module configured to generate the user profile for the user based on the user characteristics.

* * * * *

UNITED STATES PATENT AND TRADEMARK OFFICE
CERTIFICATE OF CORRECTION

Page 1 of 2

PATENT NO. : 9,152,984 B1
APPLICATION NO. : 13/549252
DATED : October 6, 2015
INVENTOR(S) : Steve Schoettler It is certified that error appears in the above-identified patent and that said Letters Patent is hereby corrected as shown below:

Title Page

On page 3, in column 2, under "Other Publications", line 27, delete "fled" and insert --filed--, therefor In the Specification In column 2, line 42, delete "display," and insert --display.--, therefor In column 4, line 6, delete "device," and insert --device.--, therefor In column 5, line 50, after "styles", insert --(italics,--, therefor In column 6, line 31, delete "Objects" and insert --objects--, therefor In column 7, line 1, delete "414" and insert --412--, therefor In column 7, line 55, delete "504)" and insert --506)--, therefor In column 10, line 63, after "player's", insert --PC--, therefor In column 12, line 20, delete "Friend 1 $_1$ 211." and insert --Friend $1_1$ 211.--, therefor In column 12, line 58, delete "&intermediated" and insert --disintermediated--, therefor In column 12, line 63, delete "100." and insert --600.--, therefor In column 13, line 41, delete "404b," and insert --604b,--, therefor In column 15, line 33, delete "white" and insert --while--, therefor Signed and Sealed this
Eighth Day of March, 2016

Michelle K. Lee
*Director of the United States Patent and Trademark Office*

CERTIFICATE OF CORRECTION (continued)
U.S. Pat. No. 9,152,984 B1

In the Specification

In column 16, line 44, delete "(FDA)," and insert --(PDA),--, therefor

In column 17, line 22, delete "808," and insert --808.--, therefor

In column 18, line 1, delete "servers," and insert --servers.--, therefor

In the Claims

In column 21, line 5, in Claim 16, after "game;", insert --¶--, therefor